No. 783,219. PATENTED FEB. 21, 1905.
H. A. PALMER.
PNEUMATIC TIRE.
APPLICATION FILED OCT. 12, 1904.
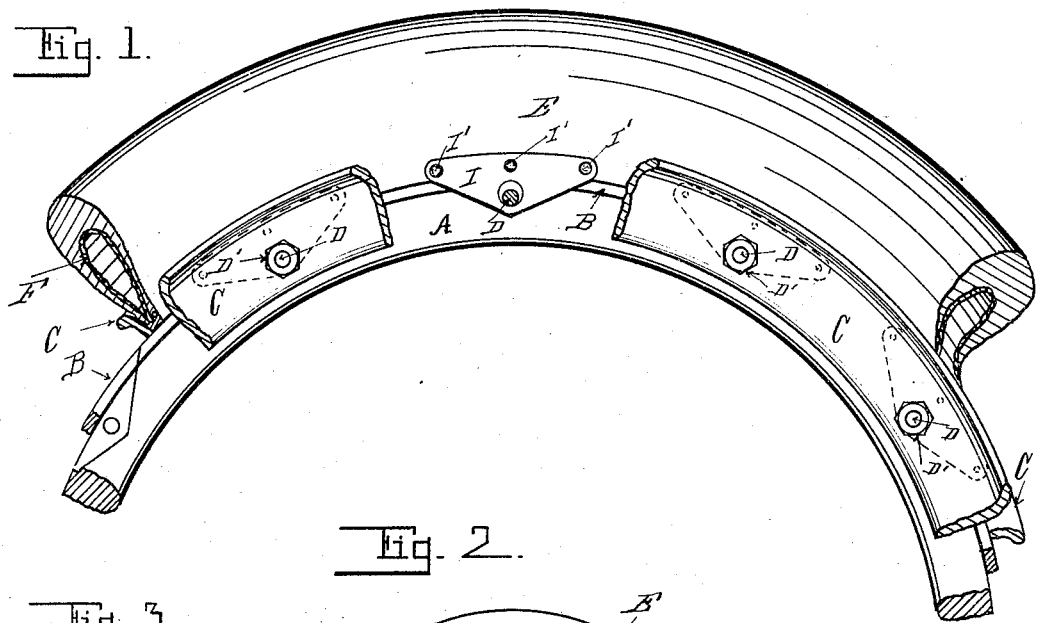
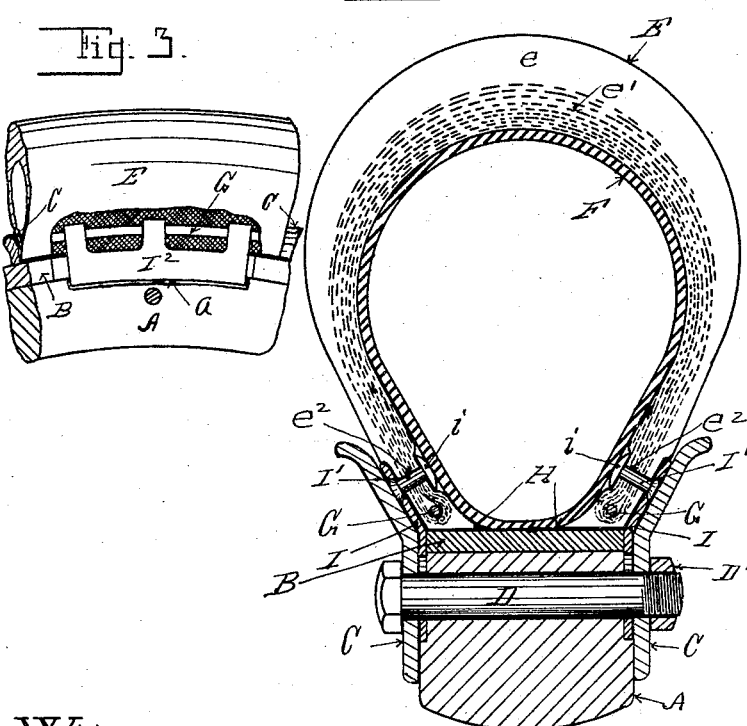
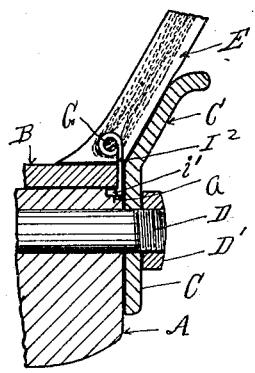
Witnesses
G. J. Mead
Florence Stockert.
Inventor.
Harry A. Palmer
By Sturgeon
Attys.

No. 783,219. Patented February 21, 1905.

UNITED STATES PATENT OFFICE.

HARRY A. PALMER, OF ERIE, PENNSYLVANIA.

PNEUMATIC TIRE.

SPECIFICATION forming part of Letters Patent No. 783,219, dated February 21, 1905.

Application filed October 12, 1904. Serial No. 228,174.

*To all whom it may concern:*

Be it known that I, HARRY A. PALMER, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to pneumatic tires and mechanism for securing the same to vehicle-wheels; and it consists, substantially, in constructing the tire-sheath preferably with reinforcing-strips in the sides of the inner faces thereof and with an annular slit or opening in the inner face thereof through which an inner tube can be inserted into and removed from the tire-sheath, combined with clips secured to the outer faces of the base of the tire and engaging the bolts securing the channel-flanges on the vehicle-wheel in which the tire is secured.

The features of this invention are hereinafter fully set forth and described, and illustrated in the accompanying drawings, in which—

Figure 1 is a side view in elevation of a section of a wheel-rim with a pneumatic tire thereon embodying my invention. Fig. 2 is a transverse section thereof. Fig. 3 is a view partially in elevation and partially in section of a section of a wheel rim and tire embodying an alternate construction of my invention. Fig. 4 is a transverse section of a portion of the same.

In Figs. 1 and 2 of the drawings, A is a transverse section of a vehicle-wheel rim, B a flat metal tire thereon, C C removable channel-flanges, and D flange-bolts for securing the channel-flanges C C to the sides of the wheel-rim A, these parts being of the usual and ordinary construction. The tire-sheath E is made of the usual outer resilient covering $e$ and inner layers $e'$ to reinforce and strengthen the sheath sufficiently to resist the air-pressure in the inner tube F therein when inflated and in use.

In the inner faces of the sides of the tire-sheath E, I preferably mold and vulcanize reinforcing-strips G G, consisting of rings of wire, cord, or other suitable material, and through the central portion of the inner face of the tire-sheath there is an annular opening H, through which an inner tube F can be inserted and removed from the tire-sheath.

Through the sides of the tire-sheath E, I make rivet-holes $e^2$, and to the sides of the sheath I secure clips I, preferably made of thin metal, by means of rivets I', passing through the holes $e^2$ in the sheath, the inner heads $i$ of the rivets I' being preferably flat and thin, so as to adequately engage the inner face of the tire-sheath E, and yet not materially interfere with the inner tube F therein. These clips I are so secured to the sides of the tire-sheath E that they will project inwardly and engage the flange-bolts D and be clamped by the channel-flanges C C against the sides of the sheath E and wheel-rim A, as clearly shown in Figs. 1 and 2. It will be seen that by removing the nuts D' from the channel-flange bolts D the channel-flange C at that side of the wheel-rim A can be readily removed and the clips I can then be moved off of the ends of the flange-bolts D and that side of the tire-sheath E moved outward, so as to remove an inner tube F from or insert one into the tire-sheath. The clips I can then be moved back over the ends of the flange-bolts D, the flange C and the nuts D' replaced, and the tire is again ready for use.

In Figs. 3 and 4 I show an alternative construction of my invention, showing another method of securing the clips to the sides of the tire-sheath and another method of engaging said clips with the wheel-rim A. In this case the upper edges of the clips I² are bent around the reinforcing-strips G and are inserted in and vulcanized into the tire-sheath during its manufacture. These clips I² are also shown with their lower edge $i'$ bent inward, so as to engage slots $a$ in the sides of the wheel-rim A under the metal tire B thereon, and operate, when clamped in place between the channel-flanges C C and the sides of the wheel-rim, to produce substantially the same results as do the clips I engaging the channel-flange bolts D, as hereinbefore described.

It will thus be seen that I am enabled to firmly secure the tire-sheath to the wheel-rim, yet at the same time the inner tube can readily be removed and replaced when desirable.

Having thus fully shown and described my invention, so as to enable others to construct and use the same, what I claim as new, and desire to secure by Letters Patent of the United States, is—

1. The combination of a pneumatic-tire sheath having an annular opening in its inner face, with inwardly-extending clips secured to the sides of said sheath and adapted to be clamped between the sides of a vehicle-wheel rim and the channel-flanges secured thereto, substantially as set forth.

2. The combination of a vehicle-wheel, channel-flanges removably secured to the sides of said wheel-rim, a pneumatic-tire sheath having an annular opening in its inner face, and clips secured to the tire-sheath extending inwardly therefrom so as to be clamped between the sides of the wheel-rim, and channel-flanges, substantially as set forth.

3. The combination of a vehicle-wheel rim, channel-flanges removably bolted thereto, a pneumatic-tire sheath having an annular opening in the inner face thereof, and clips secured to the tire-sheath extending inwardly and engaging the channel-flange bolts, between the channel-flanges and the wheel-rim, substantially as set forth.

4. The combination of a vehicle-wheel rim, channel-flanges removably bolted thereto, a pneumatic-tire sheath having an annular opening in the inner face thereof, and reinforcing-strips vulcanized in the sides thereof near its inner face, and clips secured to the sides of the sheath, and extending inwardly and engaging the channel-flange bolts between the channel-flanges and the wheel-rim, substantially as set forth.

5. The combination in a pneumatic vehicle-tire, of a tire-sheath having an annular opening in its inner face, and adapted to fit into a channel on a wheel-rim, reinforcing-strips in the sides of the inner faces of the tire-sheath and clips secured to the sides of the tire-sheath and extending inwardly and engaging the channel-flange bolts securing the channel-flanges to the sides of a wheel-rim, substantially as set forth.

6. A pneumatic vehicle-tire having clips secured in the sides thereof, said clips extending inwardly and adapted to engage the wheel-rim, and be clamped between said wheel-rim and the channel-flanges, substantially as set forth.

In testimony whereof I affix my signature in presence of two witnesses.

HARRY A. PALMER.

Witnesses:
FLORENCE STOCKERT,
J. E. BINECK.